(12) United States Patent
Partridge et al.

(10) Patent No.: US 8,122,384 B2
(45) Date of Patent: Feb. 21, 2012

(54) METHOD AND APPARATUS FOR SELECTING AN OBJECT WITHIN A USER INTERFACE BY PERFORMING A GESTURE

(75) Inventors: Kurt E. Partridge, Palo Alto, CA (US); Koji Yatani, Toronto (CA); Mark W. Newman, San Francisco, CA (US); David Goldberg, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 644 days.

(21) Appl. No.: 11/901,586

(22) Filed: Sep. 18, 2007

(65) Prior Publication Data

US 2009/0077501 A1 Mar. 19, 2009

(51) Int. Cl.
G06F 3/033 (2006.01)
(52) U.S. Cl. ........................................ 715/863; 715/864
(58) Field of Classification Search .................. 715/863, 715/864
See application file for complete search history.

(56) References Cited

U.S. PATENT DOCUMENTS

| | | | | |
|---|---|---|---|---|
| 5,220,649 A | * | 6/1993 | Forcier | 715/273 |
| 5,570,113 A | * | 10/1996 | Zetts | 345/173 |
| 5,745,116 A | * | 4/1998 | Pisutha-Arnond | 715/863 |
| 6,421,453 B1 | * | 7/2002 | Kanevsky et al. | 382/115 |
| 7,657,849 B2 | * | 2/2010 | Chaudhri et al. | 715/863 |
| 2003/0182630 A1 | * | 9/2003 | Saund et al. | 715/530 |
| 2004/0150664 A1 | * | 8/2004 | Baudisch | 345/740 |
| 2005/0134578 A1 | * | 6/2005 | Chambers et al. | 345/184 |
| 2006/0242607 A1 | | 10/2006 | Hudson | |
| 2007/0097096 A1 | | 5/2007 | Rosenberg | |
| 2007/0150842 A1 | | 6/2007 | Chaudhri | |
| 2008/0059915 A1 | * | 3/2008 | Boillot | 715/863 |
| 2008/0094371 A1 | * | 4/2008 | Forstall et al. | 345/173 |

FOREIGN PATENT DOCUMENTS

WO 2006020305 A2 2/2006

* cited by examiner

*Primary Examiner* — Omar Abdul-Ali
(74) *Attorney, Agent, or Firm* — Shun Yao; Park, Vaughan, Fleming & Dowler LLP

(57) ABSTRACT

One embodiment of the present invention provides a system that facilitates invoking a command. During operation, the system suggests with a graphic element a gesture to use to invoke a command. The system then receives the gesture from a user at a device. Note that the gesture is received via an input mechanism, and also note that the gesture is a predetermined manipulation of the input mechanism. The system then determines a graphic element within the user interface that is associated with the gesture. Finally, upon determining the object associated with the gesture, the system invokes the command associated with the graphic element.

21 Claims, 8 Drawing Sheets

METHOD AND APPARATUS FOR SELECTING AN OBJECT WITHIN A USER INTERFACE BY PERFORMING A GESTURE

The patent or application file contains at least one drawing executed in color. Copies of this patent or patent application publication with color drawing(s) will be provided by the Office upon request and payment of the necessary fee.

BACKGROUND

1. Field of the Invention

The present invention relates to computing devices. More specifically, the present invention relates to a method and an apparatus for invoking a command within a user interface by performing a gesture.

2. Related Art

Many resource-constrained mobile devices, such as cell phones, Personal Digital Assistants (PDAs), and portable media players, have touch-sensitive screens that accept input from a user in place of a traditional keyboard and/or mouse. However, the screens on these devices are often quite small, and typically provide high-resolution to display as much information as possible within the limited screen space. However, this limited screen space can lead to a multitude of input errors.

For example, some touch-sensitive devices do not come equipped with, or do not work with, a stylus. These devices require the use of a thumb or finger to provide input to the device. However, when a user wants to select an object in close proximity with another object, it can be very difficult to choose the intended object without accidentally choosing the adjacent object. Moreover, this problem is further compounded by the fact that the thumb or finger typically obscures the object one is trying to select.

In order to alleviate these problems, some devices employ a shift and magnification window to facilitate selection of the intended object. When a user places a finger on the display and holds it there for a predetermined amount of time, a smaller window pops up that displays the contents directly below the user's finger. On some devices, this window also magnifies the area directly underneath the finger tip. However, these approaches can be fraught with problems. For example, the user must wait a predetermined amount of time before the shift window is displayed. If the user needs to select multiple objects, this process can take considerable time. Furthermore, the shift window can obscure other objects on the screen.

In addition, this approach does little to solve the problem of selecting the intended object when the intended object and other objects are stacked on top of each other in the display. For example, multiple location objects may be physically on top of each other on the display if the locations represent different suites within the same building.

SUMMARY

One embodiment of the present invention provides a system that facilitates invoking a command. During operation, the system suggests with a graphic element a gesture to use to invoke a command. The system then receives the gesture from a user at a device. Note that the gesture is received via an input mechanism, and also note that the gesture is a predetermined manipulation of the input mechanism. The system then determines a graphic element within the user interface that is associated with the gesture. Finally, upon determining the graphic element associated with the gesture, the system invokes the command associated with the graphic element.

In some embodiments of the present invention, the graphic element is an icon, and suggesting the gesture with the graphic element involves displaying an icon associated with the object.

In some embodiments of the present invention, the color, shape, and/or spatial arrangement of the icon can indicate at least one of: a direction of the gesture, or a type of the object associated with the gesture.

In some embodiments of the present invention, determining the graphic element that is associated with the gesture involves determining a location of the gesture. The system also determines whether the gesture is made within a predetermined distance of an icon representing the graphic element.

In some embodiments of the present invention, determining the graphic element that is associated with the gesture involves determining a location of the gesture. The system also determines a direction of the gesture relative to the user interface. Next, the system calculates a generalized distance metric, wherein the generalized distance metric is based on: a location determined by a graphic element, a location determined by the gesture; a direction determined by the gesture and the direction suggested by the graphic element. The system further invokes a command associated with the graphic element that optimizes the generalized distance metric.

In some embodiments of the present invention, receiving the gesture further involves receiving a combination of gestures. In these embodiments, determining the graphic element that is associated with the gesture involves determining the graphic element within the user interface that is associated with the combination of gestures.

In some embodiments of the present invention, if the gesture exceeds a first predetermined threshold or if the gesture does not exceed a second predetermined threshold, the system determines that the gesture is not intended for selecting the graphic element. The first and second thresholds can be based on time and/or distance.

In some embodiments of the present invention, a graphic element that is within a predetermined distance of a second graphic element is associated with a different gesture from a gesture associated with the second object.

In some embodiments of the present invention, while receiving the gesture from the user, the system provides visual feedback to the user indicating a graphic element within the user interface that will be selected upon completion of the gesture.

In some embodiments of the present invention, the system learns the user's past gesture habit, thereby reducing user gesture errors.

In some embodiments of the present invention, the input mechanism can include at least one of: a touch-sensitive screen, a mouse, a trackball, a touch-sensitive pad, a light pen, a joystick, and an eye-tracking device. The device is a handheld device that can include at least one of: a cell phone, a Personal Digital Assistant (PDA), a portable media player, a gaming system, a camera, and a tablet computer.

In some embodiments of the present invention, the system determines that the received gesture is sufficiently different from any possible gesture suggested by any graphic element, thereby allowing the user to invoke a different command in lieu of invoking a command associated with a graphic element which suggests a gesture.

DETAILED DESCRIPTION

Figure 1:
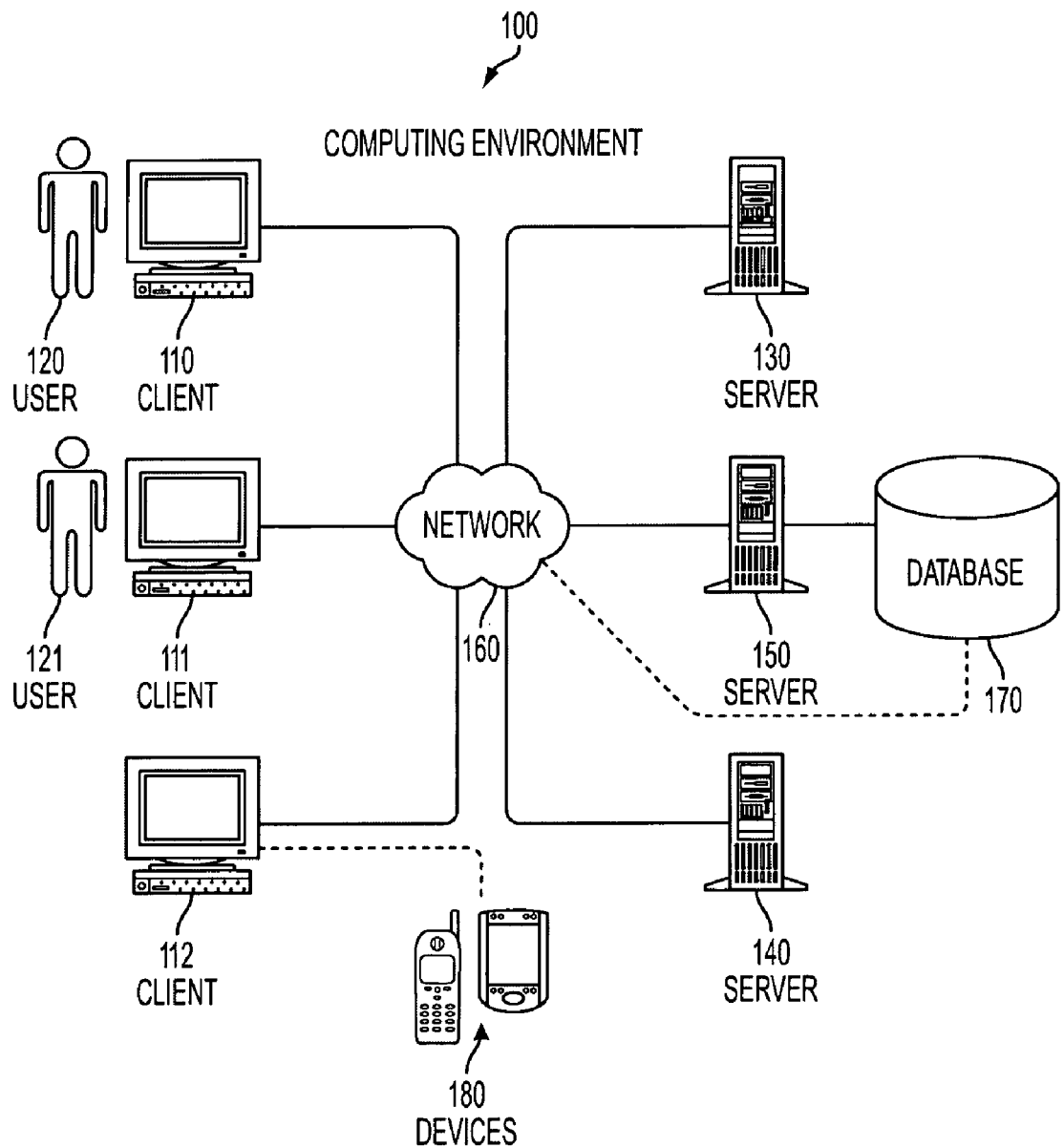
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a system that facilitates invoking a command within a user interface by performing a gesture. During operation, the system displays a graphic element on a device to a user. This graphic element suggests to the user the gesture to use to invoke the command. The system then receives the gesture from the user at the device. Note that the gesture is received via an input mechanism, and also note that the gesture is a predetermined manipulation of the input mechanism. The system then invokes the command that is associated with the gesture.

Note that although the exemplary embodiments presented herein are directed to selecting objects, embodiments of the present invention are not limited to the application of object selection. Without losing generality, embodiments of the present invention can be used for invoking any commands, which includes selecting an object.

For example, a user may slide his or her finger in an upward motion across a touch-sensitive screen on a mobile phone. The phone then selects an object displayed on the touch-sensitive screen that corresponds to the upward-motion gesture received from the user.

In some embodiments of the present invention, the graphic element is an icon associated with the object. For example, an icon representing a restaurant on a map may include a red arrow pointing towards the top of the display. This would indicate to a user to drag his or her finger or thumb in an upward motion across the display in close proximity to the icon to select the restaurant.

In some embodiments of the present invention, the color of the icon can indicate: a direction of the gesture, or a type of the object associated with the gesture. For example, in one embodiment of the present invention, every upward-motion gesture is represented by a red arrow pointing up, while every gesture up and to the right is represented by an orange arrow pointing up and to the right.

Note that color does not necessarily need to be associated with specific gestures. In fact, in one embodiment of the present invention, color is used to represent categories, or some other metadata associated with the objects. For example, in one embodiment of the present invention, each icon represents a restaurant on a map, and each icon includes a gesture to select the corresponding restaurant. In this embodiment, the color represents the type of cuisine served at each restaurant. In another embodiment of the present invention, color represents the average cost of a meal at each restaurant.

In some embodiments of the present invention, determining the object within the user interface that is associated with the gesture involves determining a location of the gesture. The system also determines whether the gesture is made within a predetermined distance of an icon representing the object. For example, in some embodiments of the present invention, it is possible for multiple objects to be associated with the same gesture. In some embodiments, the closest object associated with the gesture is selected. In other embodiments, the closest object associated with the gesture is selected, only if the gesture is made within a predetermined distance of the object. In some embodiments, an object is only selected if the gesture originates on, ends on, or crosses through the object.

In some embodiments of the present invention, determining the object that is associated with the gesture involves determining a location of the gesture. The system also determines a direction of the gesture relative to the user interface. Next, the system determines a plurality of objects that are within a predetermined distance of the location of the gesture, and have associated gestures, wherein directions of the associated gestures are within a predetermined rotational offset from the direction of the gesture received from the input mechanism. Finally, the system determines the object from the plurality of objects by performing a function on the distances and the directions of the associated gestures.

For example, consider the situation where a user makes a gesture up and to the right, and the gesture is approximately equidistant from two objects. Also consider that the direction of the gesture associated with selecting one object is straight up, and the direction of the gesture associated with selecting the other object is to the right. This situation results in the ambiguity of which of the two objects to select. This situation can be resolved in multiple ways. For example, in one embodiment of the present invention, the system maps the objects and the gesture in a three-dimensional space. Each object's gesture has a set of coordinates that can be represented by x, y, and θ. The gesture received from the user can also be mapped to a set of coordinates that can be represented by x, y, and θ. A mathematical function can then be applied to these coordinate sets to determine which object to select. In one embodiment, the system selects an object which optimizes a generalized distance metric. This distance metric can be based on: (1) a location of the object and a location of the gesture; and (2) a difference between the direction of the gesture and the direction suggested by the graphic element associated with the object.

In some embodiments of the present invention, the function is weighted such that distance is weighted more heavily than rotational offset (θ). In other embodiments, θ is more important.

In some embodiments of the present invention, the weight assigned to θ depends on the value of θ. For example, if a user is right-handed, and is making the gesture on a touch-sensitive screen using his or her right thumb, then the system might weight θ higher if θ indicates the direction of the gesture is up and to the right, and the system might weight θ lower if θ indicates the direction of the gesture is up and to the left. This is because it is naturally easier for a right handed person to move his or her thumb up and to the right along the screen of a mobile device while holding it in his or her right hand then it is for the same person to move their thumb up and to the left. Thus, the potential for error in making the gesture is potentially greater for a gesture made up and to the left.

In some embodiments of the present invention, if there is potential ambiguity between which object to select, the system selects both objects, while in other embodiments the system selects neither object. In some embodiments of the present invention, the system presents a dialog allowing the user to choose between the two objects.

In some embodiments of the present invention, receiving the gesture further involves receiving a combination of gestures. In these embodiments, determining the object that is associated with the gesture involves determining the object within the user interface that is associated with the combination of gestures.

In some embodiments of the present invention, if the gesture exceeds a predetermined threshold, the system determines that the gesture is not intended for selecting the object. Note that this threshold can include an amount of time, or a length of the gesture. For example, if the user takes a long time to draw the gesture, the gesture could be the result of unintentional contact. Furthermore, if the gesture is continuous and involves various movements, the user might be attempting to perform another function rather than selecting an object. For example, the user may be attempting to pan a map further to the right rather than selecting an object on the map. In further embodiments, the system can also employ a minimum threshold a gesture is to exceed for the gesture to be valid. For example, if the staring point and the ending point of a gesture does not exceed a certain distance, or if the gesture's during is too short, the system may regard the gesture as having been cancelled by the user. Note that in some embodiments, a threshold can be based on time or distance or both.

In some embodiments of the present invention, an object that is within a predetermined distance of a second object is associated with a different gesture from a gesture associated with the second object. For example, if two objects were on opposite sides of the screen and had the same assigned gesture, then it would be relatively easy for the device to determine which object the user was trying to select based on which side of the display the user made the gesture. However, if the two objects are relatively close, then the error rate for selecting the wrong object would increase significantly if they were assigned the same gesture.

In some embodiments of the present invention, assigning gestures to the various objects is done in a way to minimize potential selection errors. Furthermore, in some embodiments of the present invention, the icon associated with the object that displays the corresponding gesture originates from the object and points in the direction of the gesture. In these embodiments, the system may assign gestures in a manner in order to reduce overlap of the associated icons.

In some embodiments of the present invention, while receiving the gesture from the user, the system provides visual feedback to the user indicating an object within the user interface that will be selected upon completion of the gesture. Note that this allows the user to change the gesture "mid-stroke" if the visual feedback indicates that the user is selecting an object other than the intended object.

In some embodiments of the present invention, when the object is not within a predetermined distance of any other objects, the system receives a traditional selection of the object from the user via the input mechanism. In response to the traditional selection, the system selects the object. For example, if an object on the display is not within a couple of thumb-widths of any other objects, then simply tapping on the object will select the object. In other embodiments of the present invention, both methods of object selection are available regardless of the proximity of objects relative to other objects.

In some embodiments of the present invention, the input mechanism can include: a touch-sensitive screen, a mouse, a trackball, a touch-sensitive pad, a light pen, a joystick, and an eye-tracking device. Note that the preceding list is provided for exemplary purposes only. The present invention is not intended to be limited to these input devices, but rather, and input device can be used.

In some embodiments of the present invention, the device is a handheld device that can include: a cell phone, a Personal Digital Assistant (PDA), a portable media player, a gaming system, a camera, a tablet computer, or any other device that includes a display and an input mechanism.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled to a server (such as server 150), to a client, or directly through a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112. Devices 180 can include touch-sensitive displays that provide both an input mechanism for the device, as well as an output mechanism for displaying information to users 120 and 121.

Note that different embodiments of the present invention may use different configurations, and are not limited to the configuration illustrated in computing environment 100.

Object Selection via Gestures

Figure 2:
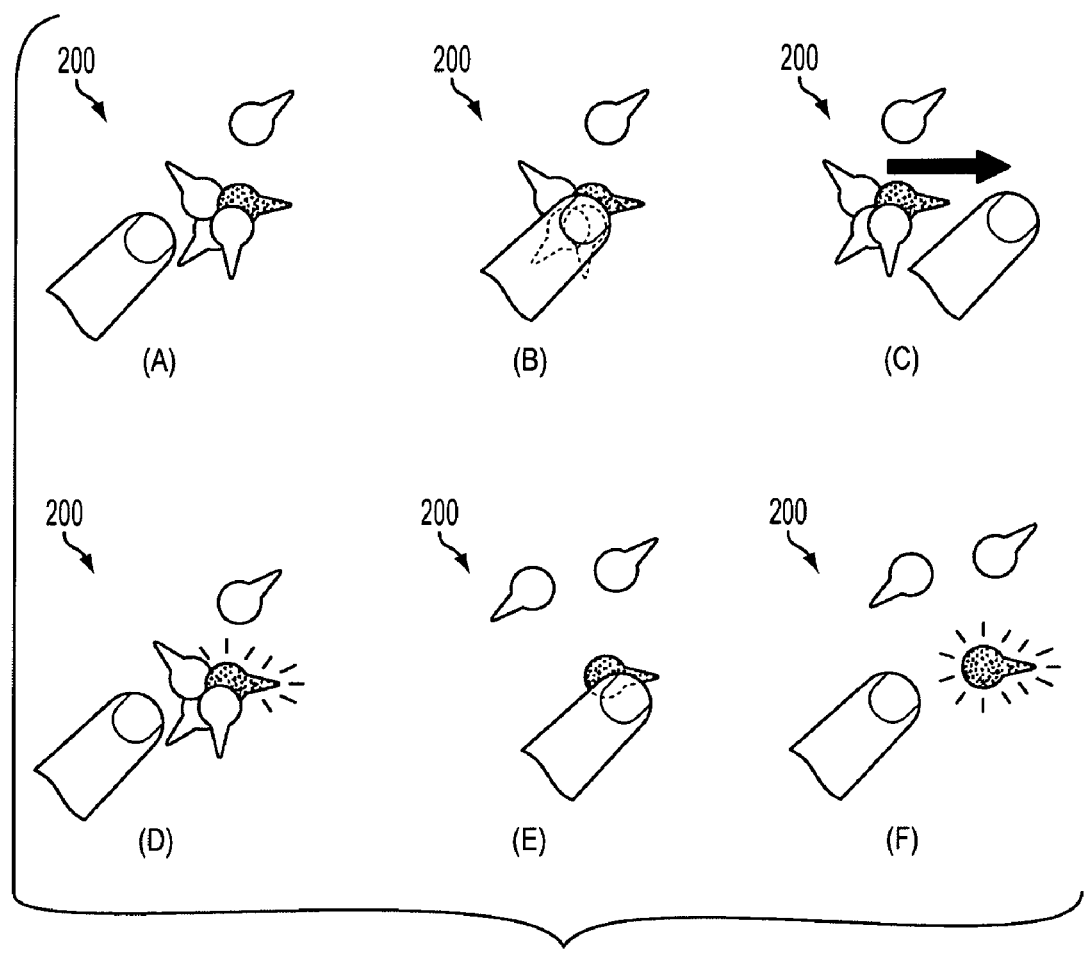
FIG. 2 illustrates object selection via gestures in accordance with an embodiment of the present invention.

FIG. 2 illustrates object selection via gestures in accordance with an embodiment of the present invention. Embodiments of the present invention are based on a direct pointing, where a user 120 can select the target by tapping an object on a screen of a device, such as device 180, and the system determines the target as the nearest item from the contact point on the screen as illustrated in section 202. Therefore, user 120 does not need to press the exact position of the target. The system also integrates a finger gesture to disambiguate the selection of the target when it seems to be difficult to select by a simple tap. For example, user 120 can select the desired target by placing the thumb around the target first. In this example, he or she does not need to point the exact position of the target. User 120 performs the gesture indicated by the icon of the desired object. The system then determines the target as the nearest target from the initial contact point and associated with the performed gesture, as illustrated in section 200.

A gesture is visually cued by an icon so that user 120 can observe not only the position of the target, but also the gesture to select the target before he or she touches the screen. This reduces both the time to create a mental model to adjust the cursor position, and the time to wait for the response from the system (e.g. displaying a menu or a callout).

Although many different gestures can be visualized by user 120, if their differences are subtle, user 120 cannot perform them distinctively with confidence. In some embodiments of the present invention, the system should use the set of gestures which user 120 can easily make with distinction from the others. Note that there is a trade-off between the simplicity and the scalability. That is, a simpler set of the gestures is more preferable with respect to physical demand and learnability, but it is not so scalable since the number of the distinctive gestures is small.

In one embodiment of the present invention, the system uses a set of directional gestures, such as an upward stroke or a leftward stroke, because they are generally easy to differentiate and perform. For example, the system might use the set of the eight major directional gestures (N, NE, E, SE, S, SW, W, and NW). It is important to note that user 120 may have difficulty conducting a gesture in a diagonal direction; however, the set of eight directional gestures can increase the number of the selectable objects on the screen.

Some embodiments of the present invention may increase the scalability of the gestures by using a different property of a gesture. For example, the system could use a short and long stroke even in the same direction as two distinctive gestures. Another embodiment uses a multi-level gesture to increase the scalability of the gesture. For example, the system asks user 120 to conduct two successive gestures (e.g., an upward stroke followed by a leftward stroke). However, this presents the problem that it is more difficult to indicate a multi-level gesture by using a small icon.

Icon Styles

Figure 3:
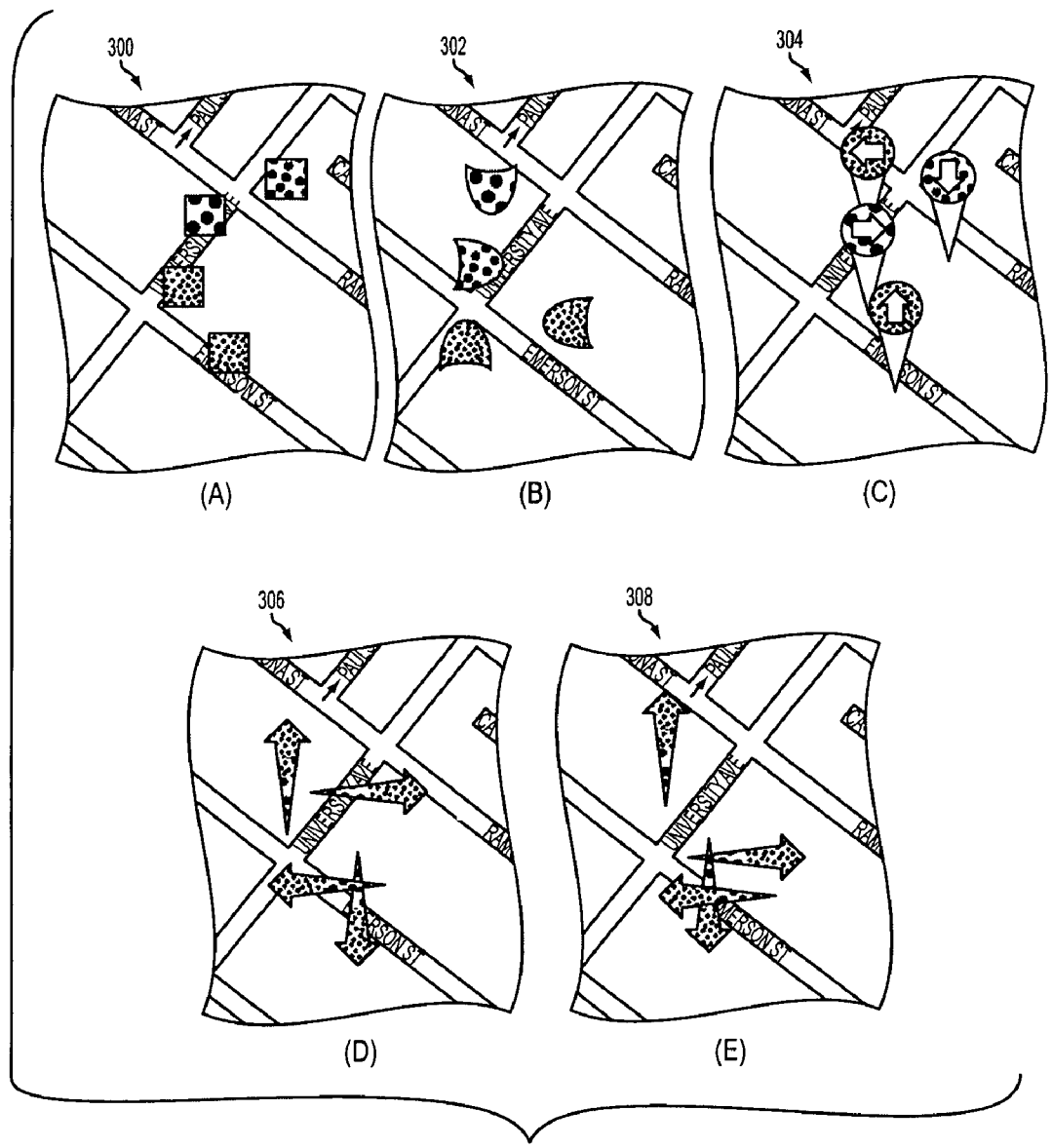
FIG. 3 illustrates various icon styles in accordance with an embodiment of the present invention.

FIG. 3 illustrates various icon styles in accordance with an embodiment of the present invention. In one embodiment of the present invention, the icons should convey to user 120 both their positions and their associated gestures. Boxes 300-308 illustrate various icon styles that convey these positions and gestures. Note that in boxes 300-304 and 308, color also indicates gesture direction. For instance, a red icon represents a North gesture. Each edge of the screen may also have a color that corresponds to the direction of a gesture. For example, red represents the upward gesture and the red line is displayed on the top of the screen. In general, the color or shape or a combination thereof can suggest a gesture for selecting the underlying object. In a further embodiment, an object's icon may have a conventional appearance, such as a button, and a gesture can be suggested by the spatial arrangement of the icon(s). For example, if two conventional buttons are displayed, a user can select the button on the left by making a gesture towards left, and select the button on the right by making a gesture towards the right.

Gesture Location

Figure 4:
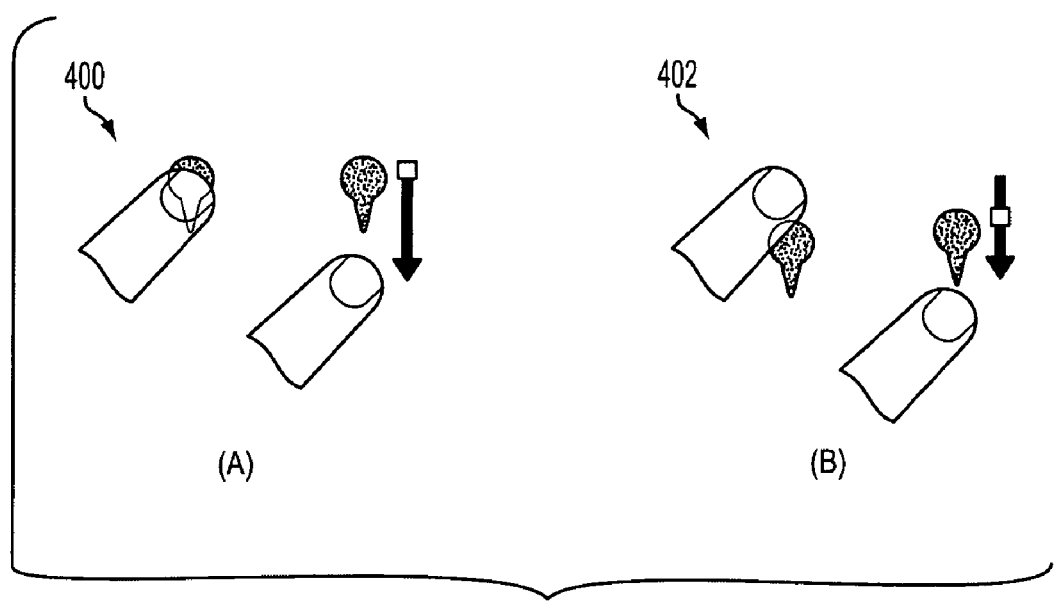
FIG. 4 illustrates gesture location in accordance with an embodiment of the present invention.

FIG. 4 illustrates gesture location in accordance with an embodiment of the present invention. In some embodiments of the present invention, it is important to note both what gesture is performed and where the gesture is performed. Two different methods for determining where a gesture is performed are illustrated in FIG. 4. One method is to regard the initial contact point as the position of the gesture occurrence (gesture 400). The other method is to use the midpoint between the initial contact point and the release point (gesture 402). User 120 crosses a target rather than touching the target before the gesture in the latter method. In some embodiments of the present invention, the determination method is configured by user 120 according to his or her preference. Note that embodiments of the present invention are not limited to these two methods. In general, the system can use any point that can be determined based on the gesture as the point of occurrence of the gesture.

The system determines the direction of the gesture performed by a user by calculating the direction between the initial contact point and the release point. In some embodiments of the present invention, the system uses a more complicated gesture recognizer.

Combination Gestures

Figure 5:
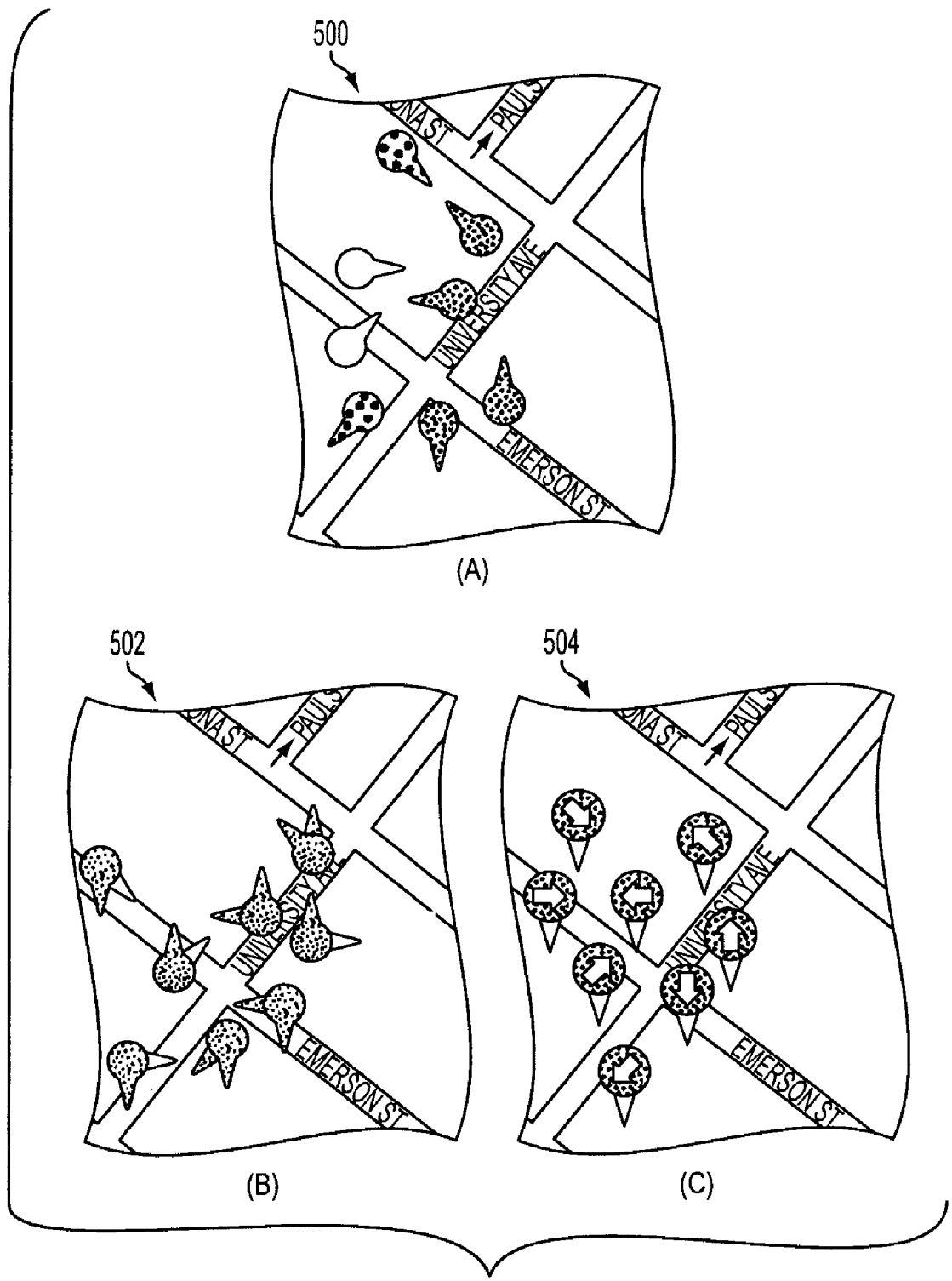
FIG. 5 illustrates combination-gesture icons in accordance with an embodiment of the present invention.

FIG. 5 illustrates combination-gesture icons in accordance with an embodiment of the present invention. In some embodiments of the present invention, the system uses icons which represent multi-level gestures (icons 502) by combining two single-gesture icons, such as the beak icons represented by icons 500. (Note that in this disclosure the pointed tip of an icon is referred to as a "beak" because of its resemblance to the beak of a bird.) For example, an icon which has a North beak in front and a West beak in back represents that user 120 can select the associated object by conducting a West gesture followed by a North gesture. Although the complexity of a gesture will increase in this multi-level icon, the multi-level icon provides more space for designing distinguishable gestures.

Selection Resolution

Figure 6:
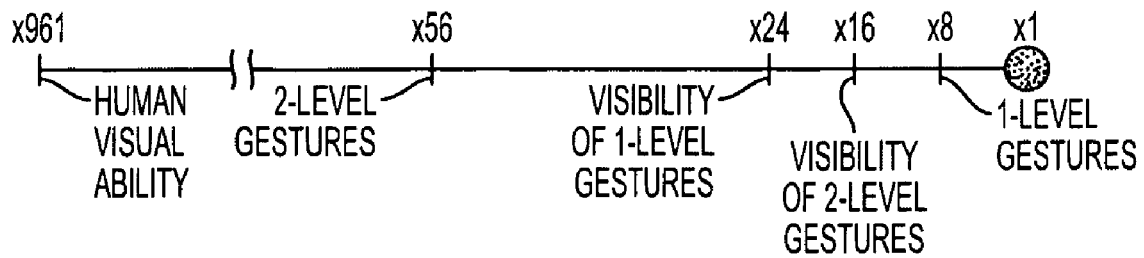
FIG. 6 illustrates selection resolution with different gesture variants in accordance with an embodiment of the present invention.

FIG. 6 illustrates selection resolution with different gesture variants in accordance with an embodiment of the present invention. More specifically, FIG. 6 illustrates how much the resolution can be increased under 1-level gestures or 2-level gestures. Due to the limits of human visual ability, user 120 cannot distinguish smaller than approximately 0.3 square millimeters. Thus, user 120 can visually process information at a resolution that is roughly 900 times finer than the area required for a single input with a finger, which is approximately 9 square millimeters. User 120 can also easily recognize approximately 24 1-level gesture icons; however, a typical number of the gestures in many embodiments of the present invention is eight, which is mainly due to the spatial constraint. Thus, the number of the gestures limits the increase of the input resolution. With 2-level gestures, the number of the gestures can be 56, but its visibility means that only 16 icons can be within a region defined by the spatial constraint.

Icon Arrangement

Figure 7:
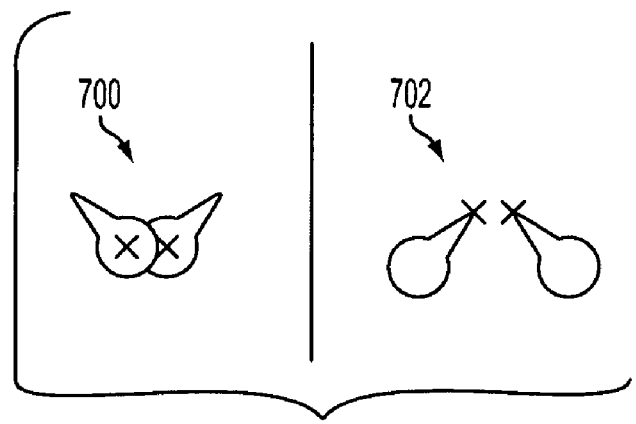
FIG. 7 illustrates icon arrangement in accordance with an embodiment of the present invention.

FIG. 7 illustrates icon arrangement in accordance with an embodiment of the present invention. Some embodiments of the present invention automatically arrange icons to minimize overlapping and occlusion. Various methods may be used to optimize icon selection. For example, in some embodiments, the "beak" of the icon is more important than the rest of the icon, so the system avoids the beak of an icon from being occluded as much as possible. This occlusion occurs when selectable items are located closely to each other. Furthermore, different embodiments may utilize different portions of the icon to identify the location of the objects. For example, the middle of icons 700 represent the corresponding objects, while the beaks of icons 702 represent the objects.

Process of Selecting an Object with a Gesture

Figure 8:
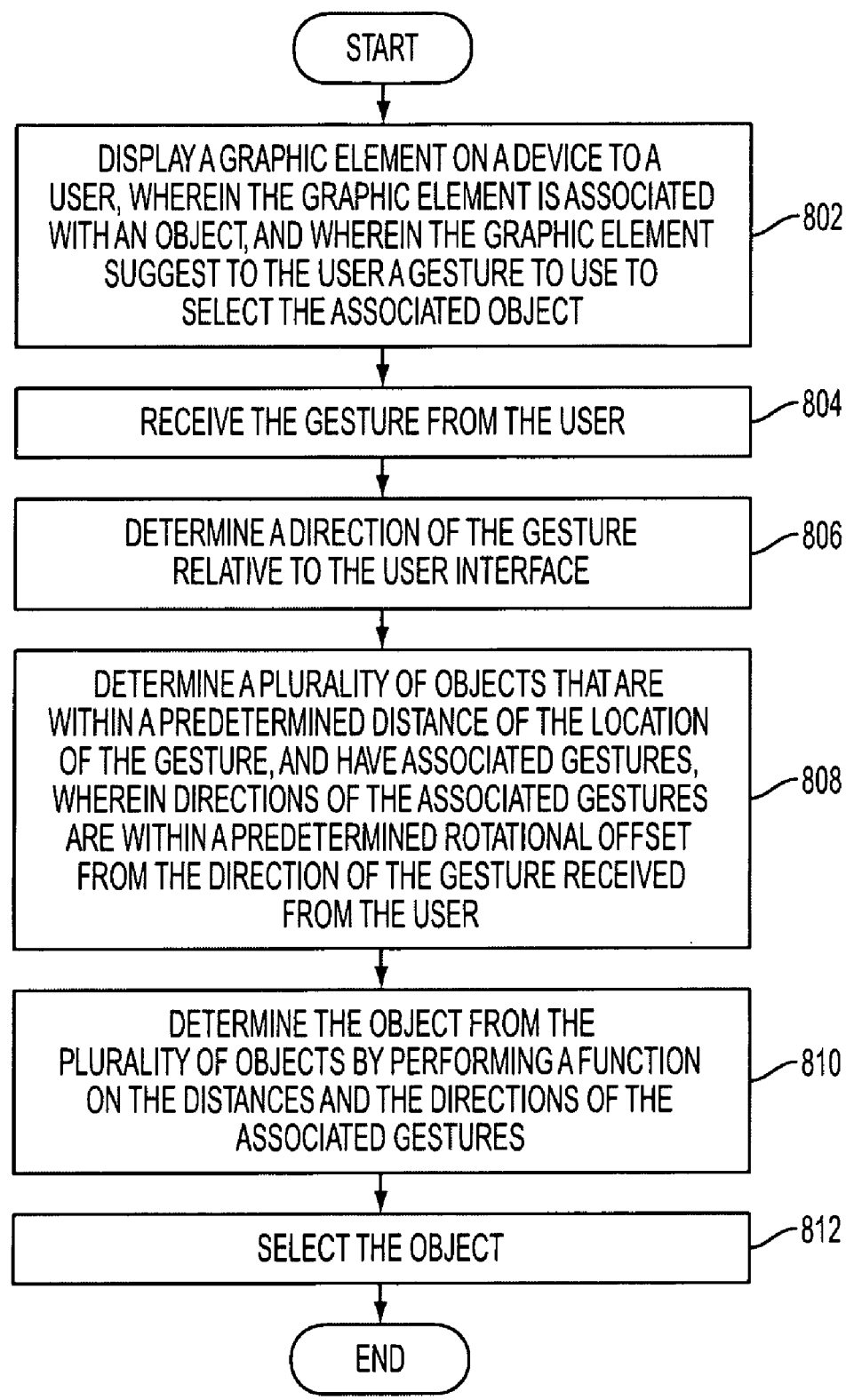
FIG. 8 presents a flow chart illustrating the process of selecting an object with a gesture in accordance with an embodiment of the present invention.

FIG. 8 presents a flow chart illustrating the process of selecting an object with a gesture in accordance with an embodiment of the present invention. During operation, the system displays a graphic element on a device 180 to a user 120 (operation 802). Note that this graphic element is associated with the object, and suggests to user 120 the gesture to use to select the object. The system then receives the gesture from user 120 at device 180 (operation 804). Note that the gesture is received via an input mechanism, and also note that the gesture is a predetermined manipulation of the input mechanism. The system also determines a direction of the gesture relative to the user interface (operation 806).

Next, the system determines a plurality of objects that are within a predetermined distance of the location of the gesture, and have associated gestures, wherein directions of the associated gestures are within a predetermined rotational offset from the direction of the gesture received from the input mechanism (operation 808). The system then determines the object from the plurality of objects by performing a function on the distances and the directions of the associated gestures (operation 810). Finally, upon determining the object associated with the gesture, the system selects the object (operation 812).

Reducing Gesture Ambiguity

One important feature of the present inventive system is determining which target to select. In particular, there are cases in which the user's gesture may not clearly indicate which of two or more icons he wants to select.

This can happen, for example, if two icons are close to each other, and have different gesture directions, and the user starts the gesture between them and gestures in a direction that is an angle halfway between the angles of the two icons. In this particular case, it appears to be a tie and, in one embodiment, the system could choose arbitrarily. Nevertheless, the user gesture could be positioned a little closer to one icon, but the angle is closer to the gesture indicated by the other icon. Which is more important: the "translation" (in this case, the starting gesture point) or the "rotation" (angle)?

One way to answer this question is to collect a fair amount of user data offline and measure how errors happen. In one embodiment, if the user is more likely to make errors in position, then position would be more heavily weighted. If the user is more likely to make errors in angle, then angle should be more heavily weighted.

By observing how a user interacts with the user interface, the system can determine whether a user is more likely to make an error of gesture translation or an error of gesture rotation. The system can use this information to reduce user gesture error or ambiguity. For example, a user who cannot easily distinguish a gesture in the north east direction from a gesture in the north direction might do better if icons only use four gestures (north, east, south, and west) but were spaced close together.

In one embodiment, the directions of each icon are carefully chosen to minimize error, and to minimize icon overlap. In a further embodiment, a system might not chose between a fixed number of gesture directions (such as 8), but might instead have a much larger number of gesture directions possible (e.g., hundreds), and choose directions that can minimize the error of gesture selection for a particular local arrangement of positions. For example, three positions in an equilateral triangle would be best distinguished if their gesture directions were 120 degrees different from each other (because 3*120=360, a complete circle).

Another issue is how to measure the translation from a gesture to an icon. The icon may have some visual feature to indicate exactly where the target is located on a map (e.g., the tip of a beak), but this might not be the best point to use when calculating distance metrics. Because the user treats the icon as a single object visually, it might be more appropriate to measure distance between the start of the user's gesture and the "center of mass" of the icon. Or to the point at the center of the bulb of the icon.

Also, the system might use a point other than the starting point of the gesture when measuring the distance between the icon and the gesture. For example, the system might compare a point determined by the icon to the point at the middle of the gesture. Such a system has the advantage of being slightly faster, because the user need not position their starting point as carefully. However, such a system might experience a higher error rate because if the user is too far off in their starting point, there is no way to gesture through an icon at the right angle—it is impossible to correct a mistake.

The technique of using gestures to disambiguate might also be useful for text entry. A soft keyboard might be designed so that individual letters have indicators that suggest a gesture direction. This would allow a soft keyboard on a much smaller screen than is available today. It would be particularly useful for such a system to support very small gestures, because then the gesture might be completed by rolling the thumb on the screen rather than dragging it. Rolling is more convenient for users because it does not involve surface friction.

One application of embodiments of the present invention is pull-down menus. If the user selects a pull down menu by tapping on the screen, then if the menu items indicate subsequent directions to make gestures, the user can distinguish between menu items by moving out from the menu items indicated directions.

In one embodiment, an operation can be cancelled by making a gesture that returns to the starting point of the gesture.

In further embodiments, the system can distinguish a gesture that is sufficiently different from any gesture suggested by any icons, so that the user can use the gesture to trigger an operation not associated with the target objects. For example, the user can draw a gesture that is sufficiently far away from any icons and use that gesture to perform operations other than selecting objects, such as dragging a map background.

In some embodiments, gestures can be made by physically moving the device rather than by dragging the thumb across a touch-screen surface. Physical device motions can be detected through accelerometers or gyroscopes, and are available on some cell phones today. Because such systems do not have the natural mechanism that a touch screen does for distinguishing the "touching" state from the "not touching" state, the system must have an additional mechanism to make this distinction. This could be done, for example, by a button on the device (presumably in a place where the user can comfortably press the button while still gripping the device in one hand). Additionally, the system could use multiple buttons, which would enable a new set of gestures for each button. Icons would then indicate not only which direction to make a gesture, but also which button to press. For example, there might be two buttons, a light button and a dark button. Icons would then be lighter or darker to indicate which button is to be used.

Having multiple icon sets based on invocation is also something that could be done with the original touch screen system if it has the right hardware. A touch screen that can detect pressure might use icons that indicate which direction to gesture and how hard to press. Or, a conventional touch screen might support single-tap selection and double-tap selection; double-tap icons-would be distinguished in some way from single-tap icons, say by having a darker boarder or a more complex shading.

Determining Icon to Object Assignment

In a working system, there typically is an algorithm for deciding how to assign icons to targets. Ideally, this algorithm aims to achieve two goals. First, all icons are to be well-separated. If several icons that all suggest the same gesture are placed too close to each other such that a user cannot select one target with relative ease, then the icons are not considered to be well-separated.

In one embodiment, the system can satisfy this criterion is to ensure that all icons suggesting similar gestures are separated by at least a distance d. For touch screens, previous research has found d to be approximately 0.5 cm.

In a further embodiment, the system can satisfy this criterion is to ensure that it is possible to draw a square with sides 2d in length around each icon so that each icon that suggests a similar gesture is the only icon suggesting that gesture in the 2d×2d square. This way, the system still allows icons to be well-separated, but allows for more freedom in icon assignment, because two icons might be immediately adjacent to each other, but because it is possible to draw such squares around them that extend away from each other, they are still well-separated.

The second goal is good visibility of the icons. If icons overlap, they may be difficult to see, and it may be difficult to determine the gesture associated with the icons. It is especially important for "beaks" to be identifiable, because they are particularly useful for identifying gestures.

Given a well-defined algorithm for determining which object to select given a gesture, the system ideally assigns icons to targets in such a way to minimize error and selection time. In one embodiment, the system employs a graph-coloring technique to solve this problem.

An example of a heuristic algorithm, which may be non-optimal but can run faster, works as follows. Icons are placed on the screen such that the beak tip is aligned with the target position. This gives the algorithm more freedom to position icons than a mechanism that positions icons so that the target point hits the center of the icon. The term "neighborhood" refers to all targets within a 1 cm radius. Each target is represented as a node in a graph. Each node has eight subnodes representing the eight possible icons, and each subnode has a weight representing the likelihood that the corresponding choice of the icon will cause an occlusion or a violation of the spatial constraint. The likelihood of an occlusion is increased when there is a nearby target that might position its icon in the same position. This algorithm calculates the initial weight of each subnode based only on occlusions.

After initial weight assignment, the algorithm starts by picking a subnode for the node that has the most nodes in its neighborhood. The subnode chosen is the one with the least weight. Then the weights at the neighborhood nodes are updated by adding a large weight to the subnodes representing the same choice of icon. Thus, the algorithm is unlikely to use the same icon for a neighborhood node and violate a spatial constraint. The algorithm proceeds in this greedy manner, at each step choosing a least-weight subnode for a node with the largest number of the neighborhood nodes. The calculation stops when it finishes the icon arrangement for all the selectable items.

Exemplary Computer System

Figure 9:
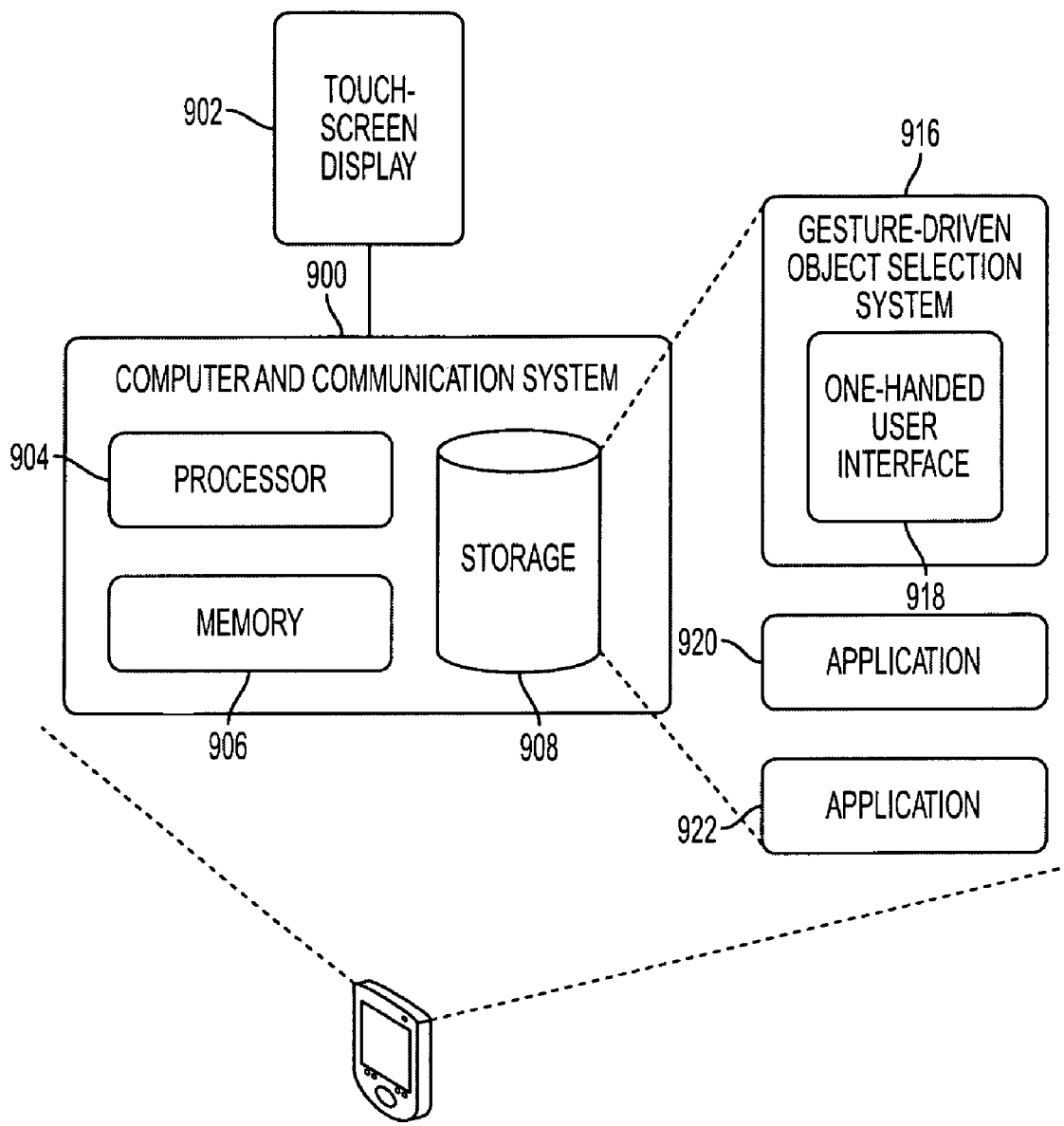
FIG. 9 illustrates an exemplary computer system with a gesture selection interface in accordance with one embodiment of the present invention.

FIG. 9 illustrates an exemplary computer system with a gesture selection interface in accordance with one embodiment of the present invention. In one embodiment, a computer and communication system 900 is coupled to a touch-screen display 902, which serves as both the input and output device. Computer and communication system 900 includes a processor 904, a memory 906, and a storage device 908.

Storage device 908 stores a gesture-driven object selection system 916, as well as other applications, such as applications 920 and 922. In one embodiment, gesture-driven object selection system 916 further includes a program that facilitates a user interface 918 which supports a one-hand operation and allows the user to operate computer and communication system 900 with one finger, preferably the thumb.

During operation, gesture-driven object selection system 916 is loaded from storage device 908 into memory 906 and then executed by processor 904. While executing the program, processor 904 performs the aforementioned functions.

Note that in the claims below, the term "invoking a command" should be interpreted as a generalized term the meaning of which includes "selecting an object." "Tapping" should be interpreted as a generalized term meaning "performing an approximate selection of a target that is later refined by a gesture." "Gesture" should be interpreted as a generalized term meaning "performing a parameterizable interface manipulation that can be quickly performed and whose parameter is used later to disambiguate the approximate selection of the initial tapping." "Icon" should be interpreted as a generalized term meaning "any indicator suggesting a gesture, which may be indicated visually (e.g., an icon as traditionally defined), or non-visually (e.g., relative spatial arrangement of icons)."

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for invoking a command, the method comprising:

displaying to a user multiple icons associated with multiple graphic elements on a user interface of a device, wherein a respective icon suggests a gesture direction;

receiving a gesture from the user via an input mechanism, wherein the received gesture is a predetermined manipulation of the input mechanism;

selecting a graphic element associated with the received gesture from the multiple graphic elements based on an optimization result of distance metrics associated with the multiple graphic elements, wherein a respective distance metric is computed based on a location of the received gesture, a location of a respective graphic element, and a difference between a direction of the received gesture and a gesture direction suggested by an icon associated with the respective graphic element; and invoking the command associated with the selected graphic element.

2. The method of claim 1, wherein the color, shape, and/or spatial arrangement of a displayed icon can indicate at least one of:
  a direction of a suggested gesture; and
  a type of the graphic element associated with the suggested gesture.

3. The method of claim 1, wherein selecting the graphic element involves:
  determining a location of the received gesture; and
  determining whether the received gesture is made within a predetermined distance of an icon representing the graphic element.

4. The method of claim 1:
  wherein receiving the gesture further involves receiving a combination of gestures; and
  wherein selecting the graphic element further involves determining the graphic element within the user interface that is associated with the combination of gestures.

5. The method of claim 1, wherein if the received gesture exceeds a first predetermined threshold or if the received gesture does not exceed a second predetermined threshold, the method further comprises determining that the gesture is not intended for selecting the graphic element; and
  wherein the first and second thresholds can be based on time and/or distance.

6. The method of claim 1, wherein a graphic element that is within a predetermined distance of a second graphic element is associated with a different gesture from a gesture associated with the second graphic element.

7. The method of claim 1, wherein while receiving the gesture from the user, the method further comprises providing visual feedback to the user indicating a graphic element within the user interface that will be selected upon completion of the gesture.

8. The method of claim 1, further comprising learning the user's past gesture habits, thereby reducing user gesture errors.

9. The method of claim 1, wherein the input mechanism can include at least one of:
  a touch-sensitive screen;
  a mouse;
  a trackball;
  a touch-sensitive pad;
  a light pen;
  a joystick; and
  an eye-tracking device; and
  wherein the device is a handheld device that can include at least one of:
  a cell phone;
  a Personal Digital Assistant (PDA);
  a portable media player;
  a gaming system;
  a camera;
  a tablet computer;
  a laptop computer; and
  a desktop computer.

10. The method of claim 1, further comprising:
  determining that the received gesture is sufficiently different from any possible gesture suggested by any icon, thereby allowing the user to invoke a different command in lieu of invoking a command associated with an icon which suggests a gesture.

11. A non-transitory computer-readable storage medium storing instructions that when executed by a computer cause the computer to perform a method for invoking a command, the method comprising:

displaying to a user multiple icons associated with multiple graphic elements on a user interface of a device, wherein a respective icon suggests a gesture direction;

receiving a gesture from the user via an input mechanism, wherein the received gesture is a predetermined manipulation of the input mechanism;

selecting a graphic element associated with the received gesture from multiple graphic elements based on an optimization result of distance metrics associated with the multiple graphic elements, wherein a respective distance metric is computed based on a location of the received gesture, a location of a respective graphic element, and a difference between a direction of the received gesture and a gesture direction suggested by an icon associated with the respective graphic element; and invoking the command associated with the selected graphic element.

12. The computer-readable storage medium of claim 11, wherein the color, shape, and/or spatial arrangement of a displayed icon can indicate at least one of:
  a direction of a suggested gesture; and
  a type of the graphic element associated with the suggested gesture.

13. The computer-readable storage medium of claim 11, wherein selecting the graphic element that is associated with the gesture involves:
  determining a location of the received gesture; and
  determining whether the received gesture is made within a predetermined distance of an icon representing the graphic element.

14. The computer-readable storage medium of claim 11:
  wherein receiving the gesture further involves receiving a combination of gestures; and
  wherein selecting the graphic element that is associated with the gesture further involves determining the graphic element within the user interface that is associated with the combination of gestures.

15. The computer-readable storage medium of claim 11, wherein if the received gesture exceeds a first predetermined threshold or if the gesture does not exceed a second predetermined threshold, the method further comprises determining that the received gesture is not intended for selecting the graphic element; and
  wherein the first and second thresholds can be based on time and/or distance.

16. The computer-readable storage medium of claim 11, wherein a graphic element that is within a predetermined distance of a second graphic element is associated with a different gesture from a gesture associated with the second graphic element.

17. The computer-readable storage medium of claim 11, wherein while receiving the gesture from the user, the method further comprises providing visual feedback to the user indicating a graphic element within the user interface that will be selected upon completion of the gesture.

18. The computer-readable storage medium of claim 11, further comprising learning the user's past gesture habits, thereby reducing user gesture errors.

19. The computer-readable storage medium of claim 11, wherein the input mechanism can include at least one of:
   a touch-sensitive screen;
   a mouse;
   a trackball;
   a touch-sensitive pad;
   a light pen;
   a joystick; and
   an eye-tracking device; and
   wherein the device is a handheld device that can include at least one of:
   a cell phone;
   a Personal Digital Assistant (PDA);
   a portable media player;
   a gaming system;
   a camera;
   a tablet computer;
   a laptop computer; and
   a desktop computer.

20. The computer-readable storage medium of claim 11, wherein the method further comprises determining that the received gesture is sufficiently different from any possible gesture suggested by any icon, thereby allowing the user to invoke a different command in lieu of invoking a command associated with an icon which suggests a gesture.

21. An apparatus configured to invoke for a command, comprising:
   a processor;
   a memory;
   a user interface configured to display to a user multiple icons associated with multiple graphic elements, wherein a respective icon suggests a gesture direction;
   a receiving mechanism configured to receive a gesture from a user via an input mechanism, wherein the received gesture is a predetermined manipulation of the input mechanism;
   a selection mechanism configured to select a graphic element associated with the received gesture from multiple graphic elements based on an optimization result of distance metrics associated with the multiple graphic elements, wherein a respective distance metric is computed based on a location of the received gesture, a location of a respective graphic element, and a difference between a direction of the received gesture and a gesture direction suggested by an icon associated with the respective graphic element; and
   a command invoking mechanism configured to invoke the command associated with the selected graphic element.

\* \* \* \* \*